United States Patent Office 3,229,769
Patented Jan. 18, 1966

3,229,769
METHOD FOR CONTROLLING THE SPREAD OF FIRE
Robert N. Bashaw, Freeport, and Billy G. Harper, Lake Jackson, Tex., assignors to The Dow Chemical Company, Midland, Mich., a corporation of Delaware
No Drawing. Filed Jan. 28, 1963, Ser. No. 254,412
9 Claims. (Cl. 169—1)

This invention relates to a method for controlling and retarding the spread of a fire to adjacent combustible materials. More particularly, it relates to such a method of particular utility in remote areas.

The tremendous losses incurred by fires are common knowledge. A great deal of that loss arises not only from the articles or thing which was initially ignited but to the loss of combustible materials adjacent that igniting source. If fires could be prevented from spreading to surrounding areas, the losses from those fires would be sharply reduced. Water is the most common element used in extinguishing fires and in preventing their spread. However, since water runs off non-horizontal surfaces, it has to be continuously renewed. For this reason, the amount of water used in extinguishing a fire and in preventing the spread of a fire is enormous. The damage caused by such large amounts of water can also be considerable, in addition to the fire damage. Many fires, such as those occurring in forests or in the outbuildings of a farm, do not have such a copious supply of water to use that means to extnguish the fire and to prevent its spread. As a consequence, forest fire spread is usually controlled by building backfires or firebreaks at a relatively great distance ahead of the uncontrolled fire. These means of necessity dedicate a great deal of vegetation to the uncontrolled fire. It would be well if a new means could be found for controlling the spread of such fires as forest fires.

Accordingly, it is the principal object of this invention to provide a method for controlling the spread of fires.

It is the further object to provide such a method finding utility in remote areas, such as in forests.

It is a still further object to provide such a method using economical, readily available, stable materials which can be stored for great lengths of time under all normal conditions without loss of effectiveness.

The above and related objects are achieved by the method whereby combustible materials adjacent to a fire are coated with a substantially continuous, adherent, particulate coating composition of water-swollen, gelled particles of a crosslinked, water-insoluble, water-swellable polymer. By means of this method, the spread of fire to those adjacent combustible materials is prevented or, at the very least, greatly retarded so that the fire can be brought under control rapidly.

The method depends upon the use of water-insoluble, water-swellable polymers in particulate form. By such polymers is meant to include any crosslinked species of a polymer whose linear analog is water soluble. Typical of such materials are crosslinked monovalent cation salts of polyacrylic, polymethacrylic, polysulfoethyl acrylic and polysulfoethyl methacrylic acids. Other typical examples include crosslinked polyglycols having average molecular weights of from about 1,000 up to a million or more; crosslinked substantially water-insoluble, water-swellable sulfonated alkaryl and aromatic polymers, such as, for example, crosslinked polysodium styrene sulfonate and sulfonated polyvinyl toluene salts; copolymers of such sulfonated alkaryl and aromatic materials with acrylonitriles, alkyl acrylonitriles, acrylates and methacrylates; crosslinked polyvinyl alcohol and polyacrylamide and crosslinked copolymers of polyacrylamide as, for example, the crosslinked copolymer of acrylamide and acrylic acid and of acrylamide and the monovalent salts of acrylic acid; crosslinked heterocyclic monomers, such as polyvinyl morpholinone, poly-5-methyl-N-vinyl 2-oxazolidinone and polyvinyl pyrrolidone; other crosslinked water-swellable but water-insoluble polymers or copolymers can also be employed.

Such materials as the above-named polymers can be made by a variety of known methods. For example, the substantially water-insoluble, water-swellable, crosslinked polyacrylate salts may be prepared by chemical crosslinking as shown in British Patent 719,330 or, alternatively, by subjecting a mixture of a monovalent cation sale of acrylic acid and water to the influences of high energy ionizing radiation for a period of time sufficient to effect the desired polymerization and the crosslinking of at least a portion of the polymer produced. In the latter instance, the amount of ionizing radiation should be at least about 0.5 megarad but greater or lesser amounts may be employed. In any event, the amount of radiation must be great enough to give a swellable polymer which takes in water or aqueous solutions and, in so doing, increases in volume but generally retains its original shape. With this class of polymeric materials, it is critical to the method of the present invention that the salt-forming cation be monovalent. Representative examples of monovalent cations include, for example, the alkali metals, that is, sodium, potassium, lithium, rubidium, and cesium, as well as water-soluble ammonium and ammonium-like radicals based upon the quaternary nitrogen atom.

Oother methods for preparing such crosslinked materials may be found in U.S. Patent 2,810,716, issued October 22, 1957, to Markus. The acrylamide polymers and copolymers may be chemically crosslinked, in addition to the materials disclosed in that patent, with methylenebisacrylamide as the crosslinker.

As earlier mentioned, it is the crosslinked, water-insoluble, water-swellable, polymeric materials which find utility in the method of the present invention. Thus, water-soluble polymers, such as linear polyacrylamide and linear polyvinyl alcohol, are not operable since such materials merely thicken an aqueous phase, but do not form a gelled particle. Thickened aqueous solutions of polymers do not provide much improvement in the spread of uncontrolled fires over water itself, since the thickened polymers flow easily and run off the surface of that which it is desired to protect.

The particles may be of any particle size and particle size distribution which is capable of being transferred to the surface of the combustible materials to be coated. Thus, particles as small as a few microns up to discrete particles of ½ inch diameter or more may be employed with equal usefulness. The particular particle size to be used in any given instance will be dictated in large measure by the method used in pumping and spraying the coating of the particles to the combustible materials.

The polymer used in gelling water, which is used as described in protecting flammable surfaces, can vary in gelling capacity. In other words, different variations in the polymer structure affect the quantity of water which the polymer imbibes. The quantity of polymer required for a given degree of protection from fire damage depends on the gelling capacity. The higher the gelling capacity of a polymer, the less polymer is required for a given degree of protection.

The swollen particles useful in the method of this invention may be prepared by simply intermixing the polymeric material into water. It frequently is helpful to the preparation of the swollen particles if the water contains a small amount of a surface tension depressant, such as the common wetting agent. Such wetting agents frequently prevent the formation of large agglomerates of the polymer. If such large agglomerates do form, it is possible to break them up into the desired small particles by subjecting the agglomerates to a shearing stress, such as that provided by the nozzle of a fire hose.

The swollen particles should contain from about 0.01 to 5.0 weight percent of the indicated crosslinked polymer. If substantially less than 0.01 weight percent is present, the particles may run off the surface due to excessive interstitial liquid. Thus, for general utility in fighting fires, such as forest fires, their use will be little better than pure water alone. Five percent polymer is a practical maximum from an economic viewpoint. Greater amounts are operable, however. Within the aforementioned limits, however, the particles find generally utility in the fighting of all fires extinguishable by water and are useful in conventional spraying and the like devices.

The swollen particles may be applied to the combustible materials by an conventional apparatus, such as the common fire-fighting spray nozzles. Depending upon the consistency of the particulate dispersion, the pressure available, and other factors, certain nozzles will provide better results than others. Selection of the nozzle that gives optimum results in any given instance will be well within the knowledge of the skilled fire fighter.

The operation of the method of this invention will be illustrated by the following examples wherein all parts and percentages are by weight.

*Example 1*

Polypotassium acrylate, which was crosslinked by subjecting to ionizing radiation, was added to deionized water containing 0.2 percent by volume of polyoxyethylene sorbitan monolaurate. The crosslinked polypotassium acrylate was in the form of a powder having a mesh size greater than 150. The mixture was stirred periodically until uniform gelling was obtained after which it was placed in a pressurized water fire extinguisher. The extinguisher was operated with 100 pounds per square inch nitrogen and the gel was sprayed through the nozzle which gave a solid cone spray pattern. The spray was caught in a suitable vessel.

Panels of yellow pine 1″ x 4″ x 1′ were dipped in the redardant to be tested. The retardants were respectively, 1 percent gel, 2 percent gel, 4 percent gel, deionized water, and deionized water containing 0.2 percent Tween 20. The panels were drained until excess material dripped off. The panels were found to be uniformly coated with retardant with the exception of a painted panel which had been dipped in deionized water.

A 14″ x 14″ x 2″ pan was constructed from ⅛″ steel. A spark plug was fired by remote controls. In order to reduce fluctuations in results, a chimney was made to shield the fire from the wind. That chimney was constructed from ⅛″ steel sheet bent into a 2′ x 2′ x 4′ high rectangular parallelopiped. The chimney was placed over the pan in an upright position to prevent wind from blowing onto the base of the flame.

The treated panels were hung by wires from pipes lying across the top of the chimney so that the bottoms of the panels were 8″ from the bottom of the pan. Two liters of gasoline were placed in the pan and ignited. After the predetermined burning time had elapsed, the fire was extinguished with carbon dioxide. Any embers were extinguished with water. The time of burning was the period from ignition to extinction. Panels were allowed to stand in a hood until cool. Any samples that were wet were allowed to dry at room temperature until a constant weight was obtained. Panels with blistered paint were lightly brushed to as to remove loose material. Both unpainted and painted panels were employed providing results as shown in the tables below. In the tables the figures in the squares indicate the percent weight loss of the panels at the given conditions of polymer concentration and exposure time.

TABLE I.—USING POLYPOTASSIUM ACRYLATE HAVING A GELLING CAPACITY OF 160 G. OF WATER/G. OF POLYMER

[Unpainted panels]

| Exposure Time (Minutes) | Percent Polymer | | | |
|---|---|---|---|---|
| | 0 | 1.0 | 2.0 | 4.0 |
| 2 | 5 | 1-2 | 0 | 0 |
| 4 | 19 | 12-13 | 3-4 | <1 |
| 6 | 31-32 | 27-28 | 15-16 | 1-2 |
| 8 | 47 | 37 | 30 | 11 |

TABLE III

[Painted panels]

| Exposure Time (Minutes) | Percent Polymer | | | | | |
|---|---|---|---|---|---|---|
| | 0 | 0.1 | 0.5 | 1.0 | 2.0 | 4.0 |
| 1 | 3 | | | | 0 | |
| 2 | 8 | | | | 1 | |
| 4 | 28 | 17 | 16 | 18 | 11 | 5 |
| 6 | 25 | | | | 15 | |

For purposes of contrast, the painted and unpainted panels treated with water and water plus a wetting agent were subjected to the same test under the same conditions. No significant difference was noticed in the effect of the two treatments.

*Example 2*

In the manner of Example 1 a polymer of potassium acrylate having a gel capacity of 280 grams water per gram polymer was used to protect unpainted pine panels. It was found after testing that the same protection was afforded the panels with this polymer using 0.5 percent of the polymer as was obtained with the gel containing 2 percent polymer in Example 1.

*Example 3*

Four panels made of 1″ x 6″ pine, unpainted, were nailed together in an open-ended box. This box was 4′ x 4′ at the base and 6′ high. A pan 32″ x 32″ x 8″ high was placed within this box. Five gallons of gasoline were poured into the pan.

The interior walls of the box were coated with protective gel or with water as a control and the gasoline ignited. The following results were obtained:

| Retardant Composition | Average Percent Weight Loss After Burning 3 Minutes |
|---|---|
| Water (control) | 15 |
| 0.5% Crosslinked polyammonium acrylate in $H_2O$; gelling capacity=385 g. $H_2O$/g. polymer | 7.5 |
| 0.5% Crosslinked polyacrylamide (10% hydrolyzed)[1] in $H_2O$; gelling capacity=625 g. $H_2O$/g. polymer | 7.7 |
| 0.3% Crosslinked polyacrylamide (30% hydrolyzed)[1] in $H_2O$; gelling capacity=1040 g. $H_2O$/g. polymer | 0 |
| 0.1% Crosslinked polyacrylamide (30% hydrolyzed)[1] in $H_2O$; gelling capacity=1040 g. $H_2O$/g. polymer | 0 |
| 4% Crosslinked polypotassium acrylate (>150 mesh) in $H_2O$; gelling capacity=160 g. $H_2O$/g. polymer | 0 |
| 0.5% Crosslinked polypotassium acrylate in $H_2O$; gelling capacity=960 g. $H_2O$/g. polymer | 0 |

[1] Hydrolyzed with aqueous sodium hydroxide, thus producing a copolymer of acrylamide and sodium acrylate.

*Example 4*

A 55 gallon drum was equipped with thermocouples and placed over a 32″ x 32″ x 8″ high pen filled with 10 gallons of gasoline. The gasoline was ignited and 7.5 gallons of 0.5 percent crosslinked polyacrylamide (10 percent hydrolyzed) in water was sprayed onto the thermocouples. The gel kept the temperature under 100° C. for two minutes.

This was repeated using 0.5 percent crosslinked polyammonium acrylate and 4 percent crosslinked polypotassium acrylate >150 mesh. The same degree of protection was obtained.

This experiment was repeated using water. The temperature rose above 100° C. while the water was being sprayed onto the drum.

*Example 5*

A 31' x 31' plot of grass was used. At the downwind side a 6' strip was sprayed with gel. This strip was 4' from the edge.

Ten gallons of 0.5 percent crosslinked polyammonium acrylate gel were used. After one half hour, the upwind edge of the grass plot was ignited. The grass burned with flames from 4 to 8 feet high until it reached the edge of the gel covered strip. The gel coated grass in the strip did not ignite. This not only protected the grass in the strip, but prevented untreated grass, which was downwind from the strip, from igniting. A wooden 4' x 4' panel coated with gel and placed in the 4 foot untreated portion was undamaged. The above example was repeated using water. Grass coated with water burned and the fire was not slowed down to any extent. The wooden 4' x 4' panel coated with water was severely damaged after the grass fire ignited it.

*Example 6*

A 4' x 4' x 1" unpainted wood panel was sprayed with 0.5 percent polyammonium acrylate and propped upright with a 1" x 4" x 6' board. This panel was placed below 6' from the downward side of a 31' x 31' grass plot. The grass was ignited upwind at the edge of the plot. The fire burned 4-6' high and engulfed the panel, but no degradation occurred. The wood was not blackened nor did it lose weight.

What is claimed is:

1. A method for controlling the spread of fire in burning, flammable materials which comprises coating the surfaces of combustible material adjacent to said burning, flammable materials with a substantially continuous, adherent, particulate coating composition of water-swollen, gelled particles of a crosslinked, water-insoluble, water-swellable polymer, said polymer constituting from about 0.01 weight percent to about 5.0 weight percent of said coating composition.

2. The method claimed in claim 1 wherein said crosslinked, water-insoluble, water-swellable polymer is crosslinked polyacrylamide.

3. The method of claim 2 wherein said polyacrylamide is crosslinked with methylenebisacrylamide.

4. The method of claim 1 wherein said cross-linked, water-insoluble, water-swellable polymer is a crosslinked copolymer of acrylamide and acrylic acid.

5. The method claimed in claim 1 wherein said crosslinked, water-insoluble, water-swellable polymer is an alkali metal salt of crosslinked polyacrylic acid.

6. The method of claim 5 wherein said alkali metal salt of crosslinked polyacrylic acid is crosslinked polypotassium acrylate.

7. The method of claim 1 wherein said crosslinked, water-insoluble, water-swellable polymer is an ammonium salt of crosslinked polyacrylic acid.

8. The method claimed in claim 1 wherein said combustible material is vegetation.

9. The method claimed in claim 1 wherein said combustible material is a wooden building structure.

References Cited by the Examiner
UNITED STATES PATENTS

| | | | |
|---|---|---|---|
| 2,810,716 | 10/1957 | Markus | 260—88.1 |
| 2,858,895 | 11/1958 | Connell | 169—1 |
| 2,976,182 | 3/1961 | Caldwell et al. | 117—135.5 |

WILLIAM D. MARTIN, *Primary Examiner.*